United States Patent
Dieckmann et al.

(10) Patent No.: US 10,149,348 B2
(45) Date of Patent: Dec. 4, 2018

(54) METHOD FOR SETTING UP AND OPERATING A WIRELESS VEHICLE NETWORK

(71) Applicant: WABCO GmbH, Hannover (DE)

(72) Inventors: Thomas Dieckmann, Pattensen (DE); Sören Hübner, Bockhorn (DE); Thomas Wolf, Barsinghausen (DE)

(73) Assignee: WABCO GMBH, Hannover (DE)

( * ) Notice: Subject to any disclaimer, the term of this patent is extended or adjusted under 35 U.S.C. 154(b) by 40 days.

(21) Appl. No.: 15/519,640

(22) PCT Filed: Oct. 9, 2015

(86) PCT No.: PCT/EP2015/001997
§ 371 (c)(1),
(2) Date: Apr. 17, 2017

(87) PCT Pub. No.: WO2016/058681
PCT Pub. Date: Apr. 21, 2016

(65) Prior Publication Data
US 2017/0245321 A1    Aug. 24, 2017

(30) Foreign Application Priority Data

Oct. 17, 2014   (DE) .................. 10 2014 015 394

(51) Int. Cl.
*H04W 84/00* (2009.01)
*G08C 17/00* (2006.01)
(Continued)

(52) U.S. Cl.
CPC ............ *H04W 84/18* (2013.01); *G08C 17/00* (2013.01); *G08C 19/00* (2013.01); *H04W 84/12* (2013.01)

(58) Field of Classification Search
CPC ............ H04B 7/18528; H04B 7/18571; H04B 7/18576; H04B 7/18541; H04W 84/06;
(Continued)

(56) References Cited

U.S. PATENT DOCUMENTS 6,073,031 A  *  6/2000  Helstab ................ H04B 1/3877
                                                       455/418
6,501,376 B2    12/2002  Dieckmann et al.
(Continued)

FOREIGN PATENT DOCUMENTS

DE    102011121279 A1    6/2013
DE    102013003853 A1    9/2014

OTHER PUBLICATIONS

PCT/EP2015/001997 International Search Report dated Mar. 1, 2016, 2 pages.
(Continued)

*Primary Examiner* — Sharad Rampuria
(74) *Attorney, Agent, or Firm* — Warner Norcross & Judd LLP (57) ABSTRACT

Disclosed is a method for setting up and operating a wireless vehicle network with at least two stations which are also interconnected via a physical line. The stations can communicate with one another both wirelessly and via the physical line during the wireless network set-up. A wireless vehicle network is also disclosed.

19 Claims, 5 Drawing Sheets

(51) Int. Cl.
*H04W 84/18* (2009.01)
*G08C 19/00* (2006.01)
*H04W 84/12* (2009.01)

(58) Field of Classification Search
CPC ............ H04W 36/00; H04W 36/0005; H04W 36/0016; H04W 84/04; H04W 88/06; H04L 47/767; H04L 12/4604; B60D 1/248; B60D 1/28; B60P 1/4464; B60Q 1/305; B60T 7/20
See application file for complete search history.

(56) References Cited

U.S. PATENT DOCUMENTS

| | | | | |
|---|---|---|---|---|
| 7,911,330 | B1* | 3/2011 | Perten | B60Q 1/305 280/DIG. 14 |
| 8,218,469 | B2* | 7/2012 | Zheng | H04B 7/15557 370/315 |
| 2002/0030590 | A1 | 3/2002 | Dieckmann et al. | |
| 2005/0062590 | A1 | 3/2005 | Lang et al. | |
| 2006/0237490 | A1* | 10/2006 | Twitchell, Jr. | B65D 90/00 222/481.5 |
| 2008/0303648 | A1 | 12/2008 | Day | |
| 2009/0219148 | A1 | 9/2009 | Thomas et al. | |
| 2013/0158740 | A1 | 6/2013 | Kahler et al. | |
| 2016/0023587 | A1* | 1/2016 | Bean | B60Q 1/0088 340/431 |

OTHER PUBLICATIONS

English language abstract and machine translation for DE102013003853 (A1) extracted from http://worldwide.espacenet.com database on Feb. 24, 2017, 34 pages.

* cited by examiner

METHOD FOR SETTING UP AND OPERATING A WIRELESS VEHICLE NETWORK

CROSS-REFERENCE TO RELATED APPLICATIONS

This application is the National Stage of International Application No. PCT/EP2015/001997, filed on 9 Oct. 2015, which claims priority to and all advantages of German Patent Application No. 10 2014 015 394.0, filed on 17 Oct. 2014, the content of which is hereby incorporated by reference.

FIELD OF THE INVENTION

The invention generally relates to a method for setting up and operating a wireless vehicle network and, more specifically, to a method for setting up and operating a wireless vehicle network with at least two stations which are also interconnected via a physical line. In addition, the invention relates to a wireless vehicle network for carrying out the method, and a control unit.

BACKGROUND OF THE INVENTION

Modern commercial vehicles are equipped with an electronic braking system, particularly in conjunction with a pneumatic braking system. An important element of the electronic braking system is a control unit which controls the functions of the braking system and receives signals via sensors and via a data connection and processes them for this purpose. Data from other control units provided in the vehicle (for example an engine control unit) can also be received via the data connection and processed.

The control of a pneumatic suspension system or the control of further functions in the vehicle can also be linked to the electronic braking system, e.g. the lifting device for a loading platform, etc.

An operation of functions by persons outside the vehicle is desirable, particularly in the case of a stationary vehicle. The driver of the vehicle should not have to stay in the driver's cab to perform the functions. In order to enable this, external operating units can be provided which are permanently disposed on the outside of vehicle and are coupled via physical lines to the electronic braking system, or which are connected via a radio link to the electronic braking system. The reading of data via the external operating units is also desirable.

The control of interconnected vehicle units and/or the reading of data from these vehicle units via an external device is also desirable.

A control system for controlling the reverse maneuvering of a pairing of a traction unit and a trailer is known from DE 10 2013 003853 A1. The control units in the traction unit and trailer are functionally connected in each case to an internal radio unit. The radio units in each case form a local radio network (WLAN) and can be connected to an external radio unit. A data exchange via a WLAN between the electronic braking system of the traction unit and the electronic braking system of the trailer is also envisaged when no cable connection exists.

In order to enable a wireless data exchange between the traction unit and the trailer, and also a wireless control by external devices of the traction unit and the trailer, an uncomplicated, automatic connection of the local radio network in the traction unit to the local radio network in the trailer is appropriate. The aim is to form a common wireless vehicle network. It must be ensured here that only vehicles which are duly authorized form a common network with one another. This is particularly difficult in depots with many vehicles located close to one another.

SUMMARY OF THE INVENTION

The present invention provides a method for automatically setting up a connection between two local vehicle networks and for setting up and operating a wireless vehicle network with at least two stations. The connection is possible, in particular, if two vehicles/two stations are also physically interconnected. A driver of the traction unit is not intended to be involved in the automated connection set-up.

In the method, the at least two stations communicate with one another both wirelessly and via the physical line during the wireless network set up. The planned set-up of the wireless network is verified and confirmed by the additional communication via the physical connection. An automatic or autonomous set-up of the wireless vehicle network without human intervention is also possible.

In certain embodiments, the method comprises:
a) transmitting signals wirelessly by a first station which indicate the first station,
b) transmitting signals wirelessly by a second station which indicate a readiness for the wireless connection to a different station,
c) setting up he physical line between the first and second stations,
d) transmitting signals by the first station via the physical line to the second station,
e) transmitting signals in response by the second station via the physical line to the first station, the signals being dependent on signals of the first station transmitted via the physical line,
f) checking the response of the second station and, following a positive check, allowing the set-up of the wireless network with the second station,
e) forming with the second station the wireless network with the first station.

Within the meaning of the invention, a station is understood to be a device which contains elements for wireless communication, i.e. a radio transmitter and radio receiver, and also elements in which signals and information relating to the vehicle are processed. In particular, a station may be a WLAN communication unit which is connected to a control unit of an electronic braking system. The WLAN communication unit and the control unit may also be integrated into one device or may be parts of a more extensive device. The station may also comprise an entire vehicle unit, such as a traction unit or trailer.

In the simplest design, the signals which are transmitted wirelessly from the first station and are intended to indicate the first station contain only the message that one station is ready to connect to another station, in particular a network partner. In addition, further information may be contained in the message, such as a unique sender identifier and details relating to the characteristics of the station. The same applies accordingly to the wirelessly transmitted signals of the second station. In addition, it can be provided for the second station that its signals contain the message that a wireless connection to a precisely designated first station is required.

The physical line between the two stations may be present or established before the two stations transmit their signals. The automatic set-up of the wireless vehicle network required according to the object of the invention does not relate to the implementation of the physical line. This is normally completed with the involvement of human operators.

Signals by which the wireless connection is authorized and verified are transmitted via the physical line. To do this, the first station typically transmits an individual message via the physical line, the message being received by the second station. The second station formulates a response which depends on the content of the message and transmits the response, typically wirelessly, back to the first station. In the simplest case, the response is a copy of the message. The response can also be sent back to the first station via a physical line. This may involve a further physical line, such as a data connection, for example a CAN bus.

The first station checks the response from the second station and compares the response with the individual message transmitted on the physical line. In the event of a match (positive check), the first station allows the formation of a wireless network with the second station. The individual message and the response may also differ from one another. The response must only be derived from the message, so that a comparison is possible.

The signals transmitted wirelessly from the first station may advantageously contain network parameters also. The signals may be the wireless signals or the signals transmitted via the physical line. Network parameters are, for example, a station identifier in the network, details of the encryption in an encrypted network, etc. Alternatively or additionally, details of the vehicle assigned to the station may be included, such as the "traction unit" or "trailer" vehicle type.

The individual message transmitted by the first station via the physical line may be a data sequence selected or generated according to the random principle. The message should not be predictable, so that third parties have no opportunity to form a network with the first station instead of the second station.

The second station advantageously transmits signals wirelessly which indicate a readiness for the wireless connection to the first station only. This means that the wireless signals from the second station relate to one first station only, for example indicating an individual identifier of the first station. This prevents the second station from starting a connection set-up to other stations. If the second station has previously received signals from two (first) stations, the second station automatically selects one of the two first stations, e.g. according to the random principle or according to the strength of the received signal. The unselected first station may come into play later, for example if the connection set-up to the selected first station is not successfully completed.

In certain embodiments, it is provided that the first station belongs to a class of stations which always transmit signals on the physical line also and expect wireless signals in response thereto. Similarly, it can be provided that the second station belongs to a class of stations which always expect signals on the physical line and transmit wireless signals in response thereto. It is not necessary for all stations to be able to transmit and receive signals via the physical line. This reduces the hardware and software requirement. The stations which transmit signals on the physical line may be referred to here as "first stations", while the stations which receive on the physical line may be referred to here as "second stations".

In these or other embodiments, it is provided that the second station forms the wireless network with the first station using network parameters of one of the two stations, in particular network parameters of the first station. The parameters of the two stations differ from one another according to the character of the network. In a local radio network according to the IEEE-802.11 WLAN standard, an access point (which establishes a network) has its own parameters, i.e., inter alia, a network identifier SSID and details of the encryption. In certain embodiments the two stations form a common network and use the network parameters of only one of the two stations, in particular the network parameters of the first station. The two stations can exchange network parameters with one another wirelessly or via the physical line. One station must generally accept the parameters of the other station and perform a reset with them.

In the method, data can be exchanged in encrypted form between the stations following the set-up of the wireless network. A network key required for this purpose is predefined by one of the stations and is transmitted via the physical line or wirelessly, e.g. via a beacon, to the other station. In particular, the network key is predefined by the first station.

In certain embodiments, the first station may be advantageously assigned to a traction unit and the second station to a trailer. Accordingly, the wireless signals from the first station may contain the "station of a traction unit" indication. The wireless signals from the second station indicate the assignment to the trailer. The information can be taken into account during the wireless connection set-up. This prevents the station of one traction unit from attempting to set up a connection to a station of another traction unit.

In various embodiments, the physical lines may be compressed air lines and/or electrical lines. A line for the control pressure of the pneumatic braking system, for example, is provided as a compressed air line. When a trailer is coupled to a traction unit, corresponding line ends of the two vehicles are interconnected. The control pressure in the compressed air line is dependent on the control pressure predefined in the traction unit. The latter can be influenced or modulated by a control unit provided for this purpose. Pressure pulses having different pressure levels can thus be sent as signals in quick succession via the compressed air line. The pressure pulses are detected in the trailer by sensors which are connected to the control unit of the trailer braking system. A resolution of the pressure pulses of 0.1 bar is readily possible. This means that, if the pressure pulses differ from one another by at least 0.1 bar, this difference is detectable by the control unit of the trailer. Similarly, voltage pulses having different voltage levels can be transmitted via the electrical line. A brake light line, for example, is provided as an electrical line. A data line can also be provided as a physical line. The control units of the participating vehicles can exchange messages in a standardized format via this line. A plurality of different physical lines can also be provided.

In certain embodiments, the wireless network is a WLAN according to the IEEE-802.11 standard. Hardware and software for WLAN networks in vehicles are often provided.

WLAN stations may be configured as access points transmit beacons or beacon frames at specific, predefined intervals. Specified according to the standard but modifiable, around 10 beacons per second are transmitted. Each beacon contains partially predefined and partially modifiable information. This includes a timestamp, the transmission interval, the SSID, details of the encryption and further information. At least one field in the beacon is unoccupied and can be populated with freely selectable information. This is the last field, which may contain vendor-specific elements. Elements which are important in connection with the set-up of the wireless network can be inserted into this field.

In certain embodiments involving the beacons, the beacons of the first station advantageously contain at least one of the following information elements in addition to the information normally provided for the WLAN:
 the first station searches for a network partner,
 type of a device assigned to the station (e.g. traction unit or trailer), and
 a unique station identifier, which does not have to match the SSID.

The unique station identifier should be selected in such a way that it is allocated once only worldwide or at least a concurrence in the area of use of the station with a second identical station identifier is not to be expected.

The second station may also be configured as an access point. In certain embodiments involving the beacons, the beacons of the second station advantageously contain at least one of the following information elements in addition to the information normally provided for the WLAN:
 signals indicating a readiness for the wireless connection to a different station (search for a network partner),
 type of a device assigned to the station (e.g. trailer),
 a unique station identifier, which does not have to match the SSID, and
 signals which depend on the signals transmitted by the first station on the physical line.

In specific embodiments, the first station sends signals to the second station via the physical line. The second station responds with wirelessly transmitted signals. These signals may be inserted into the last field of the beacon. Precisely this response of the second station may be limited to one beacon or to a limited number of beacons or to beacons within a limited time interval.

When utilized, the beacons of the second station may also include a reference to the unique station identifier of the first station so that the latter recognizes that the beacons of the second station are directed at precisely this first station.

In various embodiments of the method, the two stations communicate with one another via WDS (Wireless Distribution System) following the set-up. WDS is a method for addressing in a WLAN. A plurality of access points in the same network can communicate with one another via WDS. The network parameters of one of the access points are used for this purpose. For example, two WLAN routers can be interconnected via WDS. WLAN clients can log in to the network formed in this way and can access data available at all access points.

The present invention also provides a wireless vehicle network. The network is provided to carry out the method according to the invention and has at least two stations (wirelessly communicating with one another) which are also interconnected via a physical line. Mechanisms or techniques for transmitting and receiving signals/messages via the physical line are additionally provided, wherein at least one first station can transmit signals via the physical line and at least one second station can receive the signals transmitted via the physical line. Transmitting the signals are controllable depending on signals transmitted wirelessly between the stations. This accordingly requires two stations which can transmit and receive wirelessly and of which the first station can also transmit signals via the physical line and the second station can also receive signals via the physical line. The signals are transmitted via the physical line depending on the previously exchanged wireless signals. Hardware and software of the two stations are adapted to this functionality. The sequence is performed automatically and without intervention of a human operator, i.e. it is program-controlled.

In certain embodiments, transmitting the signals via the physical line utilizes a pressure transmitter, for example a pressure modulator. Is such embodiments, the physical line is typically a pneumatic line, in particular a control pressure line of a pneumatic braking system. Pneumatic signals/pressure pulses can be generated with the pressure transmitter and can be sent via the physical line.

In these or other embodiments, transmitting the signals via the physical line may utilize a voltage transmitter, for example a voltage modulator. In such embodiments, the physical line is typically an electrical line, in particular a brake light line. Voltages having different levels are transmitted for a short period as signals on the electrical line. A timing with different time intervals between the same or different voltage levels is also possible.

The subject-matter of the invention is also a control unit to carry out the method. A WLAN unit may be integrated. In specific embodiments, the control unit is a braking control unit.

BRIEF DESCRIPTION OF THE DRAWING

The invention is described in greater detail below with reference to the accompanying figures, in which.

DETAILED DESCRIPTION

Figure 1:
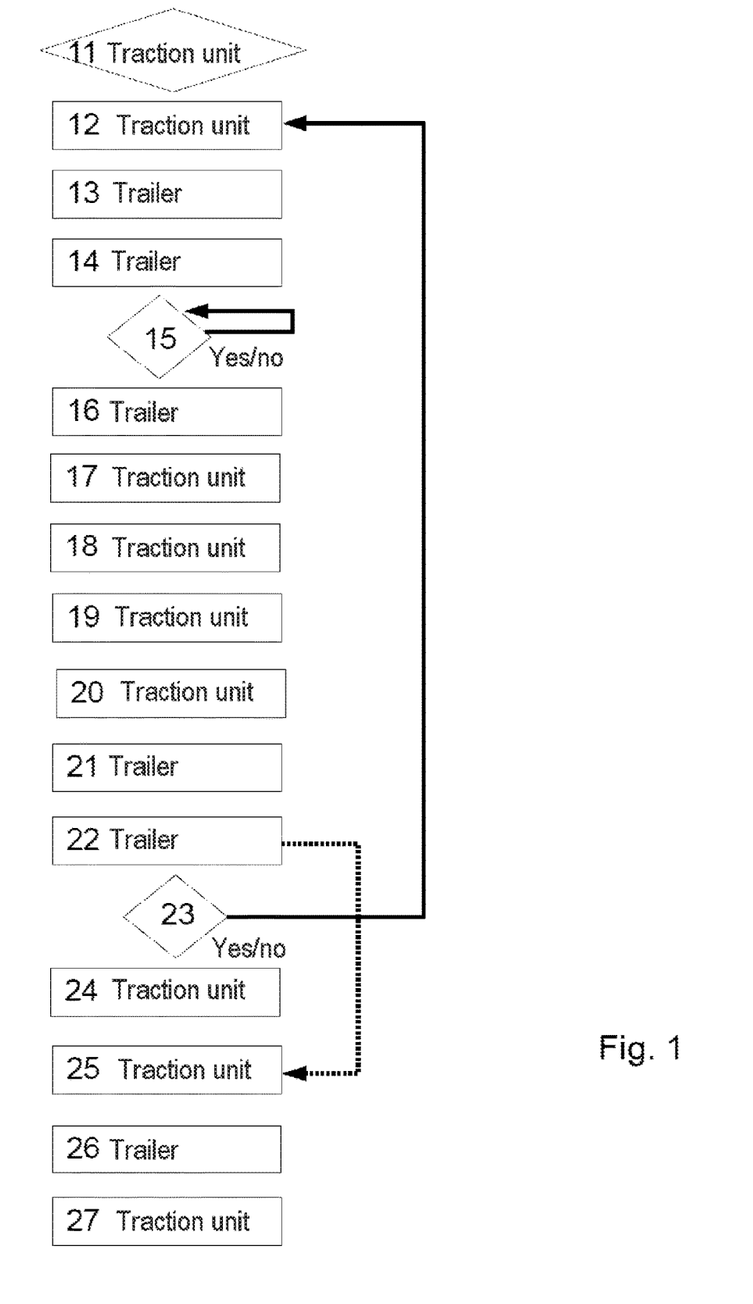
FIG. 1 shows a condensed presentation of a flow diagram for a method for setting up a wireless vehicle network.
Figure 2:
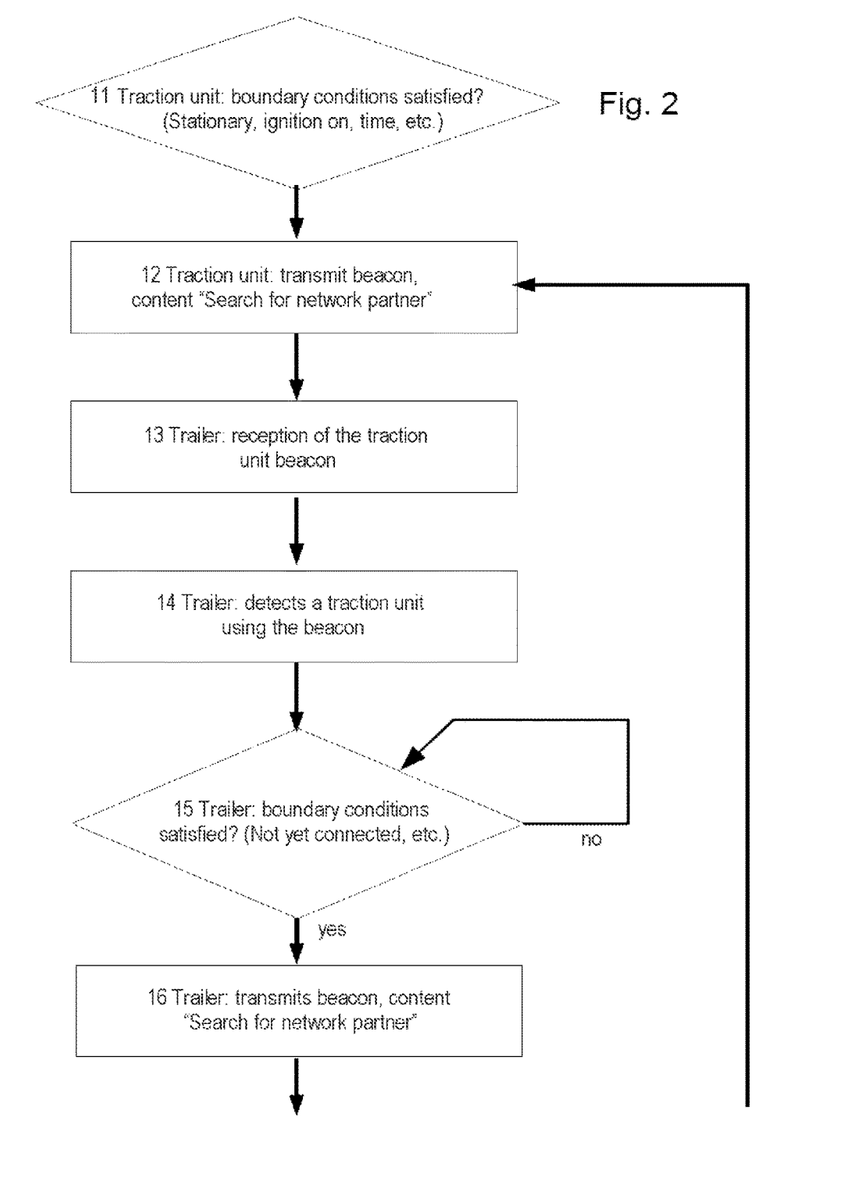
FIG. 2 shows a detail of the flow diagram according to FIG. 1, i.e. a first of three parts.
Figure 3:
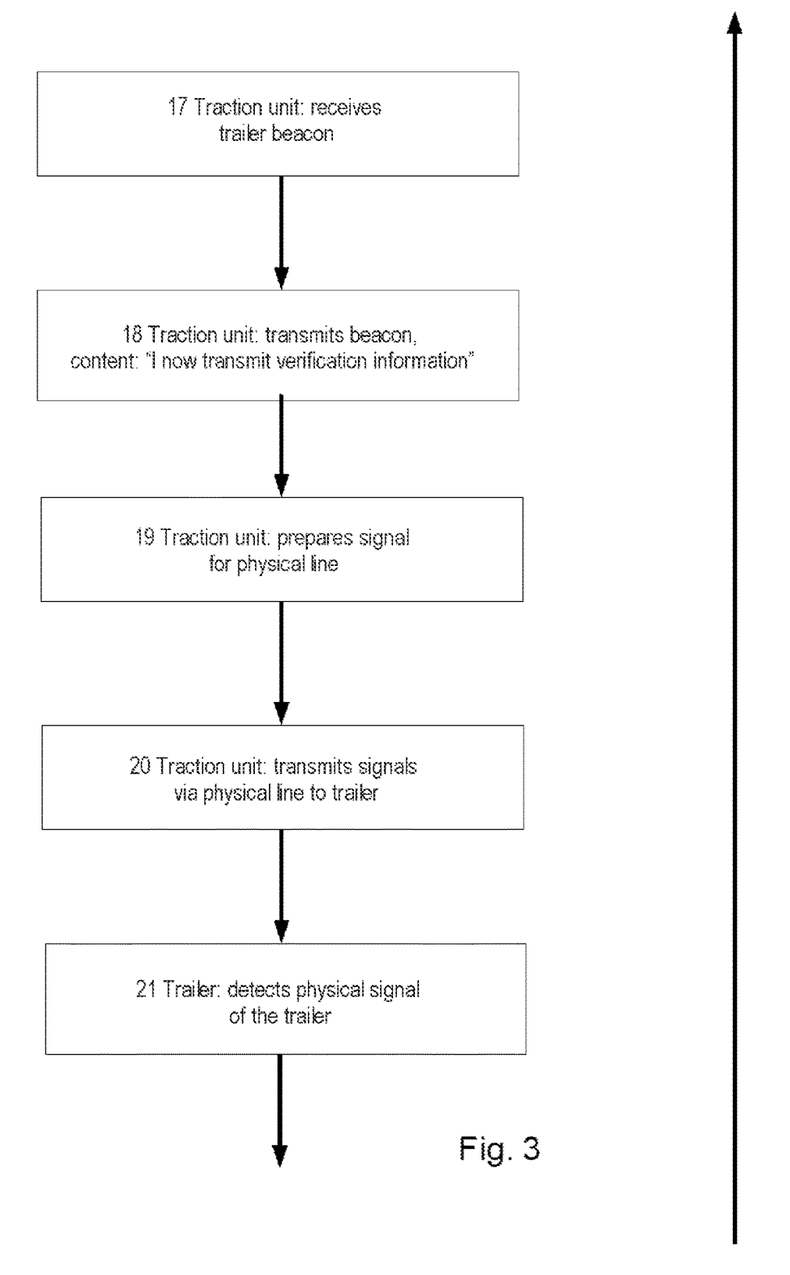
FIG. 3 shows a further detail of the flow diagram according to FIG. 1, i.e. a second part.
Figure 4:
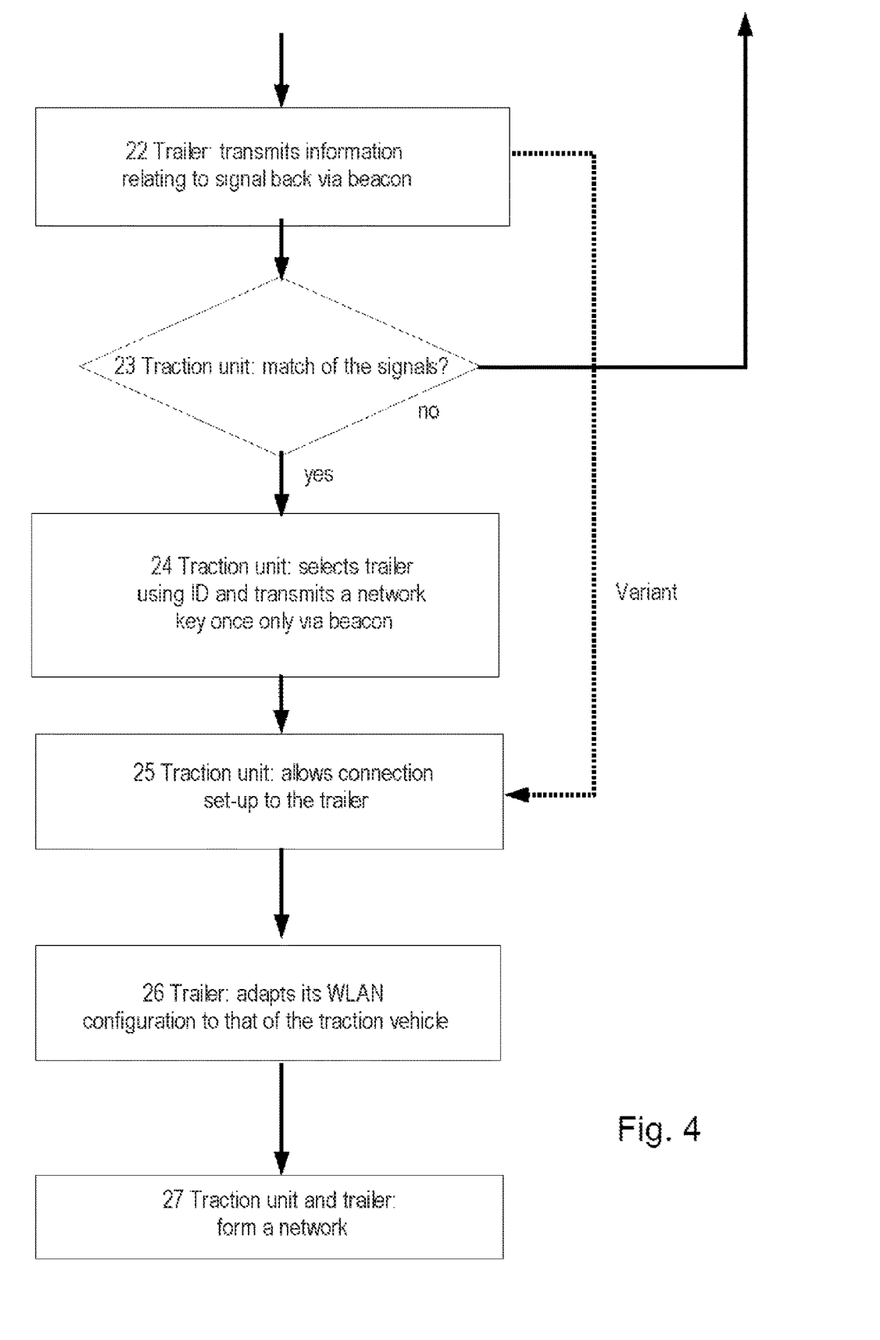
FIG. 4 shows a detail of the flow diagram according to FIG. 1, i.e. the third of three parts.

FIGS. 1 to 4 show the sequence of a method for setting up a wireless vehicle network in the form of a flow diagram with steps 11 to 27. FIG. 1 shows a condensed overview, whereas FIGS. 2 to 4 show steps 11 to 16, 17 to 21 and 22 to 27 in detail.

Figure 5:
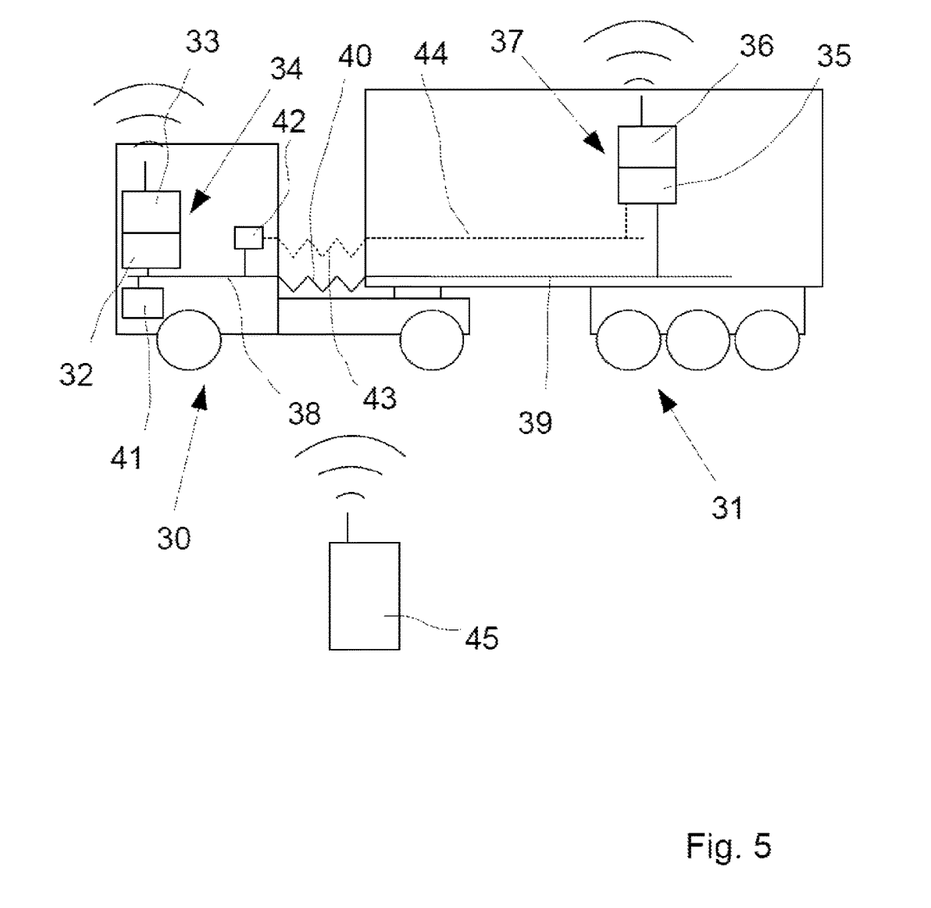
FIG. 5 shows a schematic presentation of a wireless vehicle network with a first station in a traction unit and a second station in a trailer.

In the embodiment shown in FIG. 5, a wireless vehicle network extends over a vehicle pairing consisting of a traction unit (motor vehicle) 30 and a trailer (semi-trailer) 31. An electronic control unit 32 and a WLAN unit 33 are combined in the traction unit 30 to form a first station 34 of the network. Similarly, an electronic control unit 35 and a WLAN unit 36 represent parts of a second station 37 in the trailer 31.

Here, the two control units 32, 35 are braking control units of electronic braking systems in the traction unit 30 and in the trailer 31. The latter are furthermore equipped in each case with a pneumatic braking system.

The two control units 32, 35 are connected in each case to a data bus of the vehicle. In the present example embodiment, this involves CAN buses 38, 39 which are interconnected via a standardized motor vehicle-trailer interface 40. According to FIG. 5, an engine control unit 41 is also connected to the CAN bus 38. Further devices and/or sensors can also be connected to the CAN buses 38, 39.

A braking command, depending on the actuation of a brake pedal and according to algorithms in the software of the control unit 32, is transmitted from the control unit 32 via the CAN bus 38 to a trailer control valve 42. The latter feeds a pneumatic control pressure into a control line interface 43 to which a trailer control line 44 in the trailer 31 is connected. The control pressure is sampled, for example, by the control unit 35. The control pressure is simultaneously applied to a trailer brake valve (not shown) in the trailer 31.

The two stations 34, 37 are equipped in such a way that an automatic set-up of a vehicle network is possible without the intervention of a human operator. This merely requires the coupling of the trailer 31 to the traction unit 30 with completion of the electrical connection (interface 40) and the pneumatic connection (control line interface 43), and also a pneumatic pressure line (not shown) between the traction unit 30 and the trailer 31. This results in steps 11 to 27 during the vehicle network set-up:

In this specific embodiment, it is assumed that the traction unit 30 performs the leading role in setting up the vehicle network. This entails the subsequent adaptation of network parameters of the second station 37 in the trailer 31 to the network parameters of the first station 34 in the traction unit 30, and also the verification and authorization of the connection set-up by the traction unit 30 or the first station 34. For simplification, it is assumed that the first station 34 is always provided in the traction unit 30, whereas the second station 37 is assigned to the trailer 31. If only the traction unit 11 and the trailer 13 are mentioned below, the first station 34 in the traction unit 30 and the second station 37 and the trailer 31 are therefore also meant to be included.

The set-up of the wireless vehicle network may start with the checking of the boundary conditions in the traction unit 30. This may involve, inter alia, the following conditions:
 traction unit stationary,
 ignition on,
 clock time within predefined limits,
 etc.

If the boundary conditions are satisfied, the traction unit transmits beacons via a radio link with the details normally provided in a WLAN (SSID, encryption type, etc.) and with the additional (freely selectable) details:
 "Vehicle type: Motor vehicle,
 Status: Searching" and
 "ID=xyz",
wherein "xyz" should be a one-off number for the unique marking and identification of the station.

According to step 13, the trailer 31 receives the transmitted beacons and recognizes according to step 14 on the basis of the "Vehicle type: Motor vehicle" detail that the beacons are beacons of a potential network partner. Here, the trailer 31 seeks only to form a vehicle network with a traction unit/motor vehicle.

According to step 15, the trailer 31 then checks whether predefined boundary conditions are satisfied. This generally involves the following conditions:
 The status indicated in the beacon is "searching",
 the trailer 31 is stationary.

If the boundary conditions are not satisfied, a further check of the boundary conditions takes place at the end of a previously specified time interval.

If the boundary conditions are satisfied, the set-up of the vehicle network is continued according to step 16. The trailer has not yet transmitted any beacons or has only transmitted beacons with no reference to the beacons of the traction unit 30. Accordingly, the trailer 31 then transmits beacons, on the one hand with the information normally provided in the WLAN and, on the other hand, with the individual details:
 "Type: Trailer",
 Status: Searching for partner for vehicle network", and
 "ID=vwx",
wherein "vwx" is an individual number for the unique identification of the second station 37. In addition, reference can be made to the traction unit 30, e.g. with the "Require network with ID=xyz" detail. The trailer 31 transmits its beacons once, multiple times, or until further notice.

According to step 17, the traction unit 30 receives the beacon(s) transmitted by the trailer 31. According to step 18, the traction unit 30 then transmits one or more beacons with the additional content:
 "Type: Motor vehicle",
 Status: Transmit verification information" and
 "ID=xyz".

The traction unit 30 then prepares the transmission of a signal via the physical line, i.e. here via the control line interface 43.

According to step 20, the traction unit 30 transmits a signal via the physical line to the trailer 31. To do this, the control unit 32 transmits corresponding commands to the trailer control valve 43, e.g. a sequence of four different pressure pulses, e.g. 1.9 bar, 2.1 bar, 4.0 bar and 3.3 bar. The pressure pulses in each case follow at intervals of two seconds and each have a length of one second.

According to step 21, the trailer 31 detects the physical signal transmitted by the traction unit. The trailer 31 then transmits the received physical signal, i.e. the received pressure sequence/the pressure pattern, via a beacon back to the traction unit 30. The beacon(s) contain(s) the additional information:
 "Type: Trailer",
 Status: Receive pressure pattern 1.9-2.1-4.0-3.3", and
 "ID=vwx".

In the traction unit 30, according to step 23, a check takes place for a match between the signals transmitted via the physical line and the wirelessly received signals. If no match is present, clearly no physical line exists between the traction unit and the trailer. The procedure is then interrupted and the traction unit 30 returns to step 12.

If a match is identified, the traction unit 30 accepts the trailer 31 as a network partner and transmits additional information for the encryption, e.g. a network key, with one or more beacons. The key may also be presented in encrypted form.

According to step 25, the traction unit 30 then allows the connection set-up to the trailer 31.

According to step 26, the trailer 31 adapts its WLAN configuration to that of the traction vehicle 30. This means that the trailer 31 accepts the SSID and the encryption type and, where relevant, further parameters of the configuration of the traction unit 30.

Following adaptation of the configuration of the trailer 31 the trailer, together with the traction unit 30, forms a vehicle network according to step 27, consisting of access points which can communicate with one another, for example via WDS.

Until the formation of the common vehicle network, both stations 34, 37 operate as access points with their own SSID and transmit and receive beacons with corresponding information, as previously indicated. On completion of the verification of the physical line between the traction unit 30 and the trailer 31, the second station 37 performs a reset and restarts with the configuration of the first station 34 in order to thus form the desired common vehicle network.

FIG. 5 furthermore also shows a WLAN client 45, here a mobile device of a human operator, for example a Smartphone. The human operator can dial in to the vehicle network with the Smartphone and can access both stations 34, 37.

In one variant of the previously described method for setting up the network, it is provided that steps 23 and 24 are skipped, see the broken-line path on the right next to the fields for steps 22 to 25 in FIG. 4. As soon as the trailer 31 sends back via a beacon the information transmitted on the physical line, the traction unit 30 allows the connection set-up to the trailer 31. The key for the network of the traction unit 30 (the WLAN password/a WPA 2 key) is then contained, for example, in the information transmitted via the physical line or can be calculated therefrom using a table known in the trailer 31 or an algorithm. Following a reset, the trailer 31 can dial directly in to the network of the traction vehicle 30.

The hardware and software of the two stations 34, 37 are designed to perform the aforementioned functions. The majority of the steps are carried out by the WLAN units 33, 36. The control units 32, 35 act as high-order instances and are active particularly in connection with the transmission of the signals on the physical line and in the detection thereof.

Instead of the communication by WLAN beacons during the network set-up, direct communication via a WLAN is also possible. The use of other radio technologies for setting up and operating a network is also possible. A Bluetooth network, for example, can also be set up if the distance between the stations is sufficiently short and/or the signal strength is adequate.

A brake light line (not shown) runs parallel to the interface 40 as a further physical line via which signals can similarly be transmitted. The signals can be detected by the control unit 35 directly or via sensors and can be evaluated. Finally, signals, at least CAN messages, can also be transmitted from control unit to control unit via the interface 40.

What is claimed is:

1. A method of setting up and operating a wireless vehicle network with at least two stations which are also interconnected via a physical line,
    wherein the stations can communicate with one another both wirelessly and via the physical line during the wireless network set-up, said method comprising:
    a) transmitting signals wirelessly by a first station which indicate the first station,
    b) transmitting signals wirelessly by a second station which indicate a readiness for the wireless connection to a different station,
    c) setting up the physical line between the first and second stations,
    d) transmitting signals by the first station via the physical line to the second station,
    e) transmitting signals in response by the second station via the physical line to the first station, the signals being dependent on signals of the first station transmitted via the physical line,
    f) checking by the first station the response from the second station and, following a positive check, allowing the set-up of the wireless network with the second station, and
    e) forming with the second station the wireless network with the first station.

2. The method as claimed in claim 1, wherein signals transmitted by the first station also contain network parameters.

3. The method as claimed in claim 1, wherein the signals transmitted by the first station via the physical line contain an individual message.

4. The method as claimed in claim 1, wherein the second station wirelessly transmits signals which indicate a readiness for the wireless connection to the first station only.

5. The method as claimed in claim 1, wherein the first station belongs to a class of stations which always transmit signals on the physical line also and expect wireless signals in response thereto.

6. The method as claimed in claim 1, wherein the second station belongs to a class of stations which always expect signals on the physical line also and transmit wireless signals in response thereto.

7. The method as claimed in claim 1, wherein the second station forms the wireless network with the first station using network parameters of one of the two stations.

8. The method as claimed in claim 1 wherein, following the set-up of the wireless network, data can be transmitted between stations in encrypted form, and that a network key required for this purpose is predefined by one of the stations and is transmitted via the physical line or wirelessly to the other station.

9. The method as claimed in claim 1, wherein the first station is assigned to a traction unit and the second station is assigned to a trailer.

10. The method as claimed in claim 1, wherein a compressed air line and/or an electrical line are provided as physical lines.

11. The method as claimed in claim 1, wherein the wireless network is a WLAN according to the IEEE-802.11 standard.

12. The method as claimed in claim 11, wherein the signals transmitted by the first station and/or by the second station to set up the network are contained in beacons.

13. The method as claimed in claim 12, wherein the beacons of the first station contain at least one of the following information elements in addition to the information normally provided for the WLAN:
    the first station searches for a network partner,
    type of a device assigned to the station, and
    a unique station identifier, which does not have to match the SSID.

14. The method as claimed in claim 12, wherein the beacons of the second station contain at least one of the following information elements in addition to the information normally provided for the WLAN:
    signals indicating a readiness for the wireless connection to a different station,
    type of a device assigned to the station,
    a unique station identifier, which does not have to match the SSID, and
    signals which depend on the signals transmitted by the first station on the physical line.

15. The method as claimed in claim 11, wherein the two stations communicate with one another via WDS following the network set-up.

16. A wireless vehicle network to carry out the method as claimed in claim 1, the wireless vehicle network comprising at least two stations which are also interconnected via a physical line, wherein at least one first station can transmit signals via the physical line and at least one second station also can receive the signals transmitted via the physical line, wherein transmitting the signals is controllable depending on signals transmitted wirelessly between the stations.

17. The vehicle network as claimed in claim 16, wherein transmitting the signals via the signal line utilizes a pressure transmitter, and wherein the physical line is a pneumatic line.

18. The vehicle network as claimed in claim 16, wherein transmitting the signals via the signal line utilizes a voltage transmitter, and wherein the physical line is an electrical line.

19. A control unit to carry out the method as claimed in claim 1.

* * * * *